(12) United States Patent
Yu

(10) Patent No.: US 11,967,232 B2
(45) Date of Patent: Apr. 23, 2024

(54) APPARATUS FOR PROVIDING TRAFFIC LIGHT INFORMATION, A SYSTEM HAVING THE SAME AND A METHOD THEREOF

(71) Applicants: HYUNDAI MOTOR COMPANY, Seoul (KR); KIA CORPORATION, Seoul (KR)

(72) Inventor: Hee An Yu, Bucheon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 324 days.

(21) Appl. No.: 17/473,658

(22) Filed: Sep. 13, 2021

(65) Prior Publication Data

US 2022/0189300 A1   Jun. 16, 2022

(30) Foreign Application Priority Data

Dec. 11, 2020  (KR) .......................... 10-2020-0173767

(51) Int. Cl.
| | | |
|---|---|---|
| G08G 1/0969 | (2006.01) | |
| B60K 35/00 | (2006.01) | |
| G06V 20/58 | (2022.01) | |
| G08G 1/09 | (2006.01) | |
| G08G 1/095 | (2006.01) | |
| G08G 1/0968 | (2006.01) | |

(Continued)

(52) U.S. Cl.
CPC .......... *G08G 1/0969* (2013.01); *B60K 35/00* (2013.01); *G06V 20/584* (2022.01); *G08G 1/095* (2013.01); *G08G 1/096888* (2013.01); *B60K 35/23* (2024.01); *B60K 35/26* (2024.01); *B60K 35/28* (2024.01); *B60K 35/29* (2024.01); *B60K 35/85* (2024.01); *B60K 2360/178* (2024.01); *B60K 2360/188* (2024.01); *B60K 2360/595* (2024.01)

(58) Field of Classification Search
CPC ................. G08G 1/0969; G08G 1/095; G08G 1/096888; G06V 20/584; B60K 35/00; B60K 2370/1529; B60K 2370/595; B60K 2370/178; B60K 2370/188; B60K 2370/157

See application file for complete search history.

(56) References Cited

U.S. PATENT DOCUMENTS 9,111,453 B1 *  8/2015  Alselimi ................ G08G 1/164
9,934,685 B1 *  4/2018  Bernhardt ............ G08G 1/095

(Continued)

FOREIGN PATENT DOCUMENTS

KR          101666086 B1      10/2016

*Primary Examiner* — Chico A Foxx
(74) *Attorney, Agent, or Firm* — Lempia Summerfield Katz LLC

(57) ABSTRACT

A traffic light information providing apparatus, a vehicle system including the same, and a method thereof may include: a storage configured to accumulate and store intersection traffic light information; and a processor configured to convert turn-on information of a traffic light of an intersection in front of a vehicle into a database in the storage during driving of the vehicle, and configured to pre-provide a user with traffic light information at the intersection or traffic light information at a crosswalk in a turning direction before or while passing through the intersection based on the converted database of the turn-on information of the intersection traffic light.

18 Claims, 21 Drawing Sheets

(51) Int. Cl.
*B60K 35/23* (2024.01)
*B60K 35/26* (2024.01)
*B60K 35/28* (2024.01)
*B60K 35/29* (2024.01)
*B60K 35/85* (2024.01)

(56) References Cited

U.S. PATENT DOCUMENTS

| | | | | |
|---|---|---|---|---|
| 10,730,457 | B1* | 8/2020 | Smith | B60K 37/02 |
| 2002/0115423 | A1* | 8/2002 | Hatae | G08B 25/08 |
| | | | | 455/404.1 |
| 2006/0181433 | A1* | 8/2006 | Wolterman | G08G 1/164 |
| | | | | 340/905 |
| 2009/0005984 | A1* | 1/2009 | Bradley | G01C 21/20 |
| | | | | 701/469 |
| 2011/0260886 | A1* | 10/2011 | Nagura | G08G 1/081 |
| | | | | 340/905 |
| 2011/0313609 | A1* | 12/2011 | Endo | G08G 1/096758 |
| | | | | 701/23 |
| 2012/0146814 | A1* | 6/2012 | Kim | G08G 1/096783 |
| | | | | 340/929 |
| 2013/0110316 | A1* | 5/2013 | Ogawa | G08G 1/096725 |
| | | | | 701/1 |
| 2013/0110371 | A1* | 5/2013 | Ogawa | G08G 1/095 |
| | | | | 701/1 |
| 2015/0054658 | A1* | 2/2015 | Kosatka-Pioro | G08G 1/096783 |
| | | | | 340/905 |
| 2015/0084791 | A1* | 3/2015 | Jang | G08G 1/07 |
| | | | | 340/944 |
| 2018/0079421 | A1* | 3/2018 | Chen | B60W 30/192 |
| 2018/0208203 | A1* | 7/2018 | Gordon | B60W 10/04 |
| 2019/0122548 | A1* | 4/2019 | Sakuma | G08G 1/08 |
| 2019/0244519 | A1* | 8/2019 | Cha | G08G 1/096783 |
| 2020/0074856 | A1* | 3/2020 | Cao | G08G 1/095 |
| 2020/0312138 | A1* | 10/2020 | Kurehashi | G08G 1/096716 |
| 2020/0353932 | A1* | 11/2020 | Wang | G08G 1/04 |
| 2021/0027076 | A1* | 1/2021 | Hayashi | G08G 1/09623 |
| 2021/0053566 | A1* | 2/2021 | Kobayashi | B60W 40/04 |
| 2022/0036726 | A1* | 2/2022 | Kim | G08G 1/052 |
| 2022/0081011 | A1* | 3/2022 | Kleinau | G08G 1/09623 |
| 2022/0084403 | A1* | 3/2022 | Liu | G06V 20/58 |
| 2022/0092313 | A1* | 3/2022 | Cheng | G06V 20/52 |
| 2022/0319317 | A1* | 10/2022 | Kamakura | H04L 67/12 |

* cited by examiner

| NO | Time | Traffic light | NO | Time | Traffic light |
|----|------|---------------|----|------|---------------|
| 1 | 27-07-2020 11:20:05 ~ 11:20:10 | Green | 15 | 30-07-2020 10:23:13 ~ 10:23:18 | Green |
| 2 | 27-07-2020 13:20:37 ~ 13:20:39 | Orange | 16 | 31-07-2020 13:18:57 ~ 13:19:46 | Red |
| 3 | 27-07-2020 13:20:40 ~ 13:20:545 | Left+ Green | 70 | 31-07-2020 13:19:47 ~ 13:20:36 | Green |
| 4 | 27-07-2020 13:20:55 ~ 13:20:56 | Orange | 71 | 31-07-2020 11:18:14 ~ 11:19:36 | Red |
| 5 | 27-07-2020 13:20:57 ~ 13:21:46 | Red | 72 | 31-07-2020 11:19:37 ~ 11:20:13 | Green |
| 6 | 27-07-2020 18:10:07 ~ 18:10:10 | Green | 205 | 03-08-2020 09:30:20 ~ 09:30:25 | Green |
| 7 | 28-07-2020 09:10:20 ~ 18:10:15 | Green | 206 | 03-08-2020 11:20:30 ~ 11:20:33 | Orange |
| 8 | 28-07-2020 15:25:05 ~ 15:25:08 | Green | 207 | 03-08-2020 11:20:34 ~ 11:20:59 | Left+ Green |
| 9 | 28-07-2020 15:25:09 ~ 15:25:12 | Orange | 208 | 03-08-2020 11:21:00 ~ 11:21:03 | Orange |
| 10 | 29-07-2020 09:50:15 ~ 09:50:20 | Green | 210 | 03-08-2020 11:21:04 ~ 11:21:54 | Red |

Fig.4

| NO | Time | Traffic light |
|---|---|---|
| 1 | 27-07-2020<br>08:23:13 ~ 06:23:18 | Red |
| 2 | 27-07-2020<br>08:23:19 ~ 08:23:24 | Green |
| 3 | 27-07-2020<br>10:21:47 ~ 10:21:52 | Orange |
| 4 | 27-07-2020<br>10:21:53 ~ 10:22:08 | Left+<br>Green |
| 5 | 27-07-2020<br>10:21:09 ~ 10:22:10 | Orange |
| 6 | 27-07-2020<br>10:22:11 ~ 10:23:02 | Red |
| 7 | 27-07-2020<br>10:23:03 ~ 10:23:08 | Green |
| 8 | 03-08-2020<br>15:20:34 ~ 15:20:38 | Left+<br>Green |
| 9 | 03-08-2020<br>15:20:39 ~ 15:20:41 | Orange |
| 10 | 03-08-2020<br>15:20:42 ~ 11:21:32 | Red |

Fig.5

| NO | Time | Traffic light |
|---|---|---|
| 1 | 27-07-2020 09:10:30 ~ 09:10:35 | Green |
| 2 | 27-07-2020 13:20:36 ~ 13:20:38 | Orange |
| 3 | 28-07-2020 10:20:10 ~ 13:21:25 | Left+ Green |
| 4 | 28-07-2020 10:20:26 ~ 13:21:08 | Orange |
| 5 | 28-07-2020 10:21:09 ~ 13:21:59 | Red |
| 6 | 29-07-2020 13:20:47 ~ 13:20:49 | Orange |
| 7 | 29-07-2020 13:20:50 ~ 13:21:05 | Left+ Green |
| 8 | 29-07-2020 13:21:06 ~ 13:21:08 | Orange |
| 9 | 29-07-2020 13:21:09 ~ 13:21:59 | Red |
| 10 | 30-07-2020 09:50:15 ~ 09:50:20 | Green |

Fig.6

| Time | Time | Traffic light | Time | Time | Traffic light |
|---|---|---|---|---|---|
| 1 | 27-07-2020 06:00:01 | | 15 | 27-07-2020 06:00:55 | Left+ Green |
| 2 | 27-07-2020 06:00:02 | | 16 | 27-07-2020 06:00:56 | |
| 3 | 27-07-2020 06:00:03 | | | | |
| 4 | 27-07-2020 06:00:04 | | 18 | 27-07-2020 06:01:09 | Orange |
| 5 | 27-07-2020 06:00:05 | Green | 19 | 27-07-2020 06:01:10 | |
| 6 | 27-07-2020 06:00:06 | | 20 | 27-07-2020 06:01:11 | |
| 7 | 27-07-2020 06:00:07 | | 21 | 27-07-2020 06:01:12 | Red |
| 8 | 27-07-2020 06:00:08 | | 22 | 27-07-2020 06:01:13 | |
| 9 | 27-07-2020 06:00:09 | | 23 | 27-07-2020 06:01:14 | |
| | ---------- | | | ---------- | |
| 11 | 27-07-2020 06:00:51 | | 25 | 27-07-2020 06:02:01 | |
| 12 | 27-07-2020 06:00:52 | Orange | 26 | 27-07-2020 06:02:02 | Green |
| 13 | 27-07-2020 06:00:53 | | 27 | 27-07-2020 06:02:03 | |
| 14 | 27-07-2020 06:00:54 | Green | 28 | 27-07-2020 06:02:04 | |

Fig.7

| Time | Time | "A" Intersection Traffic light | "C" Crosswalk Traffic light (72) |
|---|---|---|---|
| 1 | 27-07-2020 08:22:13 ~ 08:22:33 | Red | Red |
| 2 | 27-07-2020 08:22:34 ~ 08:23:24 | Green | 30 sec after green is turned on |
| 3 | 27-07-2020 10:21:47 ~ 10:21:52 | Orange | Red |
| 4 | 27-07-2020 10:21:53 ~ 10:22:08 | Left+Green | Red |
| 5 | 27-07-2020 10:21:09 ~ 10:22:10 | Orange | Red |
| 6 | 27-07-2020 10:22:11 ~ 10:23:02 | Red | Red |
| 7 | 27-07-2020 10:23:03 ~ 10:23:53 | Green | 30 sec after green is turned on |
| 8 | 03-08-2020 15:20:34 ~ 15:20:38 | Orange | Red |
| 9 | 03-08-2020 15:20:39 ~ 15:20:41 | Left+Green | Red |
| 10 | 03-08-2020 15:20:42 ~ 11:21:32 | Orange | Red |

Fig.8B

| NO | Crosswalk traffic light in direction A(52) | | | Crosswalk traffic light in direction D(82) | | |
|---|---|---|---|---|---|---|
| | Intersection traffic light in direction D(81) | | | Intersection traffic light in direction B(61) | | |
| 1 | 27-.. 11:19:25 ~ 11:19:45 | Red | Red | 27-.. 11:20:10 ~ 11:20:21 | Red | Red |
| 2 | 27-.. 11:19:46 ~ 11:20:36 | Green | 30 sec after green is turned on | 27-.. 11:20:22 ~ 11:21:12 | Green | 30 sec after green is turned on |
| 3 | 27-.. 13:20:37 ~ 13:20:39 | Orange | Red | 27-.. 13:21:47 ~ 13:21:49 | Orange | Red |
| 4 | 27-.. 13:20:40 ~ 13:20:54 | Left+ Green | Red | 27-.. 13:21:50 ~ 13:22:04 | Left+ Green | Red |
| 5 | 27-.. 13:20:55 ~ 13:20:56 | Orange | Red | 27-.. 13:22:05 ~ 13:22:06 | Orange | Red |
| 6 | 27-.. 13:20:57 ~ 13:21:46 | Red | Red | 27-.. 13:22:07 ~ 13:22:56 | Red | Red |
| 7 | 27-.. 13:21:47 ~ 13:22:16 | Green | 30 sec after green is turned on | 27-.. 13:22:57 ~ 13:23:47 | Green | 30 sec after green is turned on |
| 8 | 28-.. 09:10:20 ~ 09:10:23 | Orange | Red | 28-.. 09:10:20 ~ 09:10:23 | Orange | Red |
| 9 | 28-.. 09:10:24 ~ 09:10:38 | Left+ Green | Red | 28-.. 09:11:3 ~ 09:11:49 | Left+ Green | Red |
| 10 | 28-.. 09:10:39 ~ 09:10:41 | Orange | Red | 28-.. 09:11:49 ~ 09:11:51 | Orange | Red |

Fig.9B

| Traffic light (1 Cycle) | SVM image HMI + Turn-on remaining time of traffic light | | HUD HMI display | Remark |
|---|---|---|---|---|
| Green (50sec) | | Front wide view | | Driving signal: Green<br>- Front wide view image, turned-on traffic light, and remaining time are displayed |
| Orange (3sec) | | ← | | Forewarning for stop : Orange<br>- Front wide view image and turned-on traffic light are displayed |
| Red + ← (15sec) | | Front+ side view (Left) | | Left turn driving signal: Arrow green<br>- Front view + side view(left) image, turned-on traffic light, turn-on remaining time of crosswalk traffic light are displayed |
| Red +Orange (2sec) | | ← | | Forewarning for stop : Orange<br>- Front view + side view (left) image and turned-on traffic light are displayed |
| Red (50sec) | | Front view + Rear view | | Driving signal: Red<br>- Front view + rear view image, turned-on traffic light, and remaining time are displayed |

FIG.12

| Traffic light(1 Cycle) | SVM image HMI + Turn-on remaining time of traffic light | | HUD HMI display | Remark |
|---|---|---|---|---|
| Left turn | | Front + side view (Left) | | Turn-on signal of crosswalk traffic light : Red or Green<br>- Front view + side view (left) image is displayed |
| Right turn stop (unprotected) | | Front + side view (Right) | | Turn-on signal of crosswalk traffic light : Red<br>- Front view + side view (right) image is displayed<br>- "Be careful of pedestrians when turning right" is displayed |
| Right turn warning (unprotected) | | Front + side view (Right) | | Turn-on signal of crosswalk traffic light : Orange<br>- Front view + side view (right) image is displayed<br>- "Be careful of pedestrians when turning right" is displayed |
| Right turn safety (unprotected) | | Front + side view (Right) | | Turn-on signal of crosswalk traffic light : Green<br>- Front view + side view (right) image is displayed<br>- "Be careful of pedestrians when turning right" is displayed |

FIG.13

APPARATUS FOR PROVIDING TRAFFIC LIGHT INFORMATION, A SYSTEM HAVING THE SAME AND A METHOD THEREOF

CROSS-REFERENCE TO RELATED APPLICATION

This application claims priority to and benefits of Korean Patent Application No. 10-2020-0173767, filed in the Korean Intellectual Property Office on Dec. 11, 2020, the entire contents of which are incorporated herein by reference.

BACKGROUND

(A) Field of the Disclosure

The present disclosure relates to a traffic light information providing apparatus, a vehicle system including the same, and a method thereof, and more particularly, to a technique capable of providing a user with a remaining time of turning on, i.e., before a light change of, a traffic light in front at an intersection.

(b) Description of the Related Art

When a vehicle suddenly stops due to a traffic light obscured by a vehicle (a large vehicle) in front at an intersection during driving, or when there is a yellow or red traffic light, vehicles may still enter the intersection. This may cause an accident risk, traffic may be congested due to the entry of a tailgating vehicle, and accidents with pedestrians at a crosswalk may occur frequently in the case of an unprotected right turn.

In addition, a sudden change in a traffic light at the intersection causes a vehicle to accelerate to enter the intersection, resulting in a speeding violation and a signal violation.

In addition, it is uncomfortable to recognize a traffic light while waiting for a signal and an accident may occur due to an abrupt stop or sudden start caused by not knowing remaining time information of turning on or a light change of a traffic light.

The above information disclosed in this Background section is only to enhance understanding of the background of the present disclosure. Therefore, the Background section may contain information that does not form the prior art that is already known in this country to a person of ordinary skill in the art.

SUMMARY

An embodiment of the present disclosure has been made in an effort to provide a traffic light information providing apparatus, a vehicle system including the same, and a traffic light information providing method. The apparatus, the system, and the method are capable of preventing speeding, signal violations, and accidents by accumulating and storing intersection traffic light information based on image data of a traffic light in front at an intersection and pre-providing a user with a lighting status and turn-on remaining time of a traffic light at the intersection before a vehicle passes through the intersection.

An embodiment of the present disclosure has been made in an effort to provide a traffic light information providing apparatus, a vehicle system including the same, and a traffic light information providing method. The apparatus, the system, and the method are capable of improving visibility by providing turn-on information of a traffic light at an intersection together with an optimized image through a head-up display or a surround view monitoring system of a vehicle.

The technical objects of the present disclosure are not limited to the objects mentioned above. Other technical objects not mentioned can be clearly understood by those having ordinary skill in the art from the description of the claims.

An embodiment of the present disclosure provides a traffic light information providing apparatus including a storage configured to accumulate and store intersection traffic light information. The apparatus also includes a processor configured to convert turn-on information of a traffic light of an intersection in front of a vehicle into a database in the storage during driving of the vehicle. The processor is also configured to pre-provide a user with traffic light information at the intersection or traffic light information at a crosswalk in a driving or turning direction before or while passing through the intersection based on the converted database of the turn-on information of the intersection traffic light.

In an embodiment, the apparatus may further include a display device configured to display a turn-on color and a turn-on remaining time of the intersection traffic light.

In an embodiment, the processor may accumulate and store the turn-on information of the intersection traffic light in the storage for each time.

In an embodiment, the processor may calculate a turn-on or change cycle and a turn-on remaining time of the intersection traffic light based on the turn-on information of the intersection traffic light.

In an embodiment, the processor may estimate a turn-on or change cycle of an intersection traffic light in a second direction that is opposite to a first direction of the intersection based on turn-on information of the intersection traffic light in the first direction.

In an embodiment, the processor may calculate a turn-on or change cycle of the intersection traffic light in a third direction that is perpendicular to the first direction by calculating a time delay difference between turn-on times of the intersection traffic light in the third direction based on the turn-on information of the intersection traffic light in the first direction of the intersection.

In an embodiment, the processor may generate a virtual traffic light based on crosswalk traffic light information in a right or left turn direction and pedestrian detection information when a vehicle turns right or left at an intersection.

In an embodiment, the processor may display the virtual traffic light together with the intersection traffic light in orange or yellow on the display device and outputs a text for attention when the vehicle turns right, a crosswalk traffic light in a traveling direction is green, and a pedestrian crossing the crosswalk is not detected.

In an embodiment, the processor may display the virtual traffic light together with the intersection traffic light in green on the display device when the vehicle turns right, a crosswalk traffic light in a traveling direction is red, and a pedestrian crossing the crosswalk is not detected.

In an embodiment, the processor may display the virtual traffic light in red when the vehicle turns right, a crosswalk traffic light in a traveling direction is green or red, and a pedestrian crossing the crosswalk is detected.

In an embodiment, the processor may control a warning sound to be outputted or emitted or the virtual traffic light to be flashed and displayed when the virtual traffic light is displayed in red.

In an embodiment, the display device may display a front view and a side view together when the vehicle turns right or left and displays the intersection traffic light and a virtual traffic light at one side.

In an embodiment, the turn-on information of the intersection traffic light may include colors of the intersection traffic light and a turn-on time for each color of the intersection traffic light.

An embodiment of the present disclosure provides a vehicle system including an image acquisition device configured to acquire turn-on information of an intersection traffic light in front. The system further includes a processor configured to convert turn-on information of a traffic light of an intersection in front of a vehicle into a database in the storage during driving of the vehicle. The processor is further configured to pre-provide a user with traffic light information at the intersection or traffic light information at a crosswalk in a driving or turning direction before or while passing through the intersection based on the converted database of the turn-on information of the intersection traffic light. The system further comprises a vehicle display configured to display the traffic light information.

In an embodiment, the vehicle display may include a vehicle head-up display.

In an embodiment, the vehicle system may further include a pedestrian detection device configured to detect a pedestrian crossing a crosswalk.

An embodiment of the present disclosure provides a traffic light information providing method including collecting turn-on information of an intersection traffic light in front while a vehicle drives and converting it into a database. The method further includes generating traffic light information at an intersection or traffic light information at a crosswalk in a driving or turning direction before or while passing through the intersection based on the converted database of the turn-on information of the intersection traffic light. The method further includes pre-providing a user with the intersection traffic light information or the crosswalk traffic light information in the rotation direction.

In an embodiment, the converting of the turn-on information into the database may include accumulating and storing the turn-on information of the intersection traffic light for each time.

In an embodiment, the generating of the intersection traffic light may include calculating a turn-on or change cycle and a turn-on remaining time of the intersection traffic light based on the turn-on information of the intersection traffic light.

In an embodiment, the generating of the intersection traffic light may include generating a virtual traffic light based on crosswalk traffic light information in a right or left turn direction and pedestrian detection information when a vehicle turns right or left at an intersection.

According to the present technique, it is possible to prevent speeding, signal violations, and accidents by accumulating and storing intersection traffic light information based on image data of a traffic light in front of a vehicle at an intersection and by pre-providing a user with a lighting status and turn-on remaining time of a traffic light at the intersection before a vehicle passes through the intersection.

According to the embodiment of the present disclosure, it is possible to improve visibility by providing turn-on information of a traffic light at an intersection together with an optimized image through a head-up display or a surround view monitoring system of a vehicle. Thus, user recognition convenience may be increased and traffic signal compliance and safe driving may be ensured.

In addition, various effects that can be directly or indirectly identified through this document may be provided.

BRIEF DESCRIPTION OF THE DRAWINGS

FIG. 4 illustrates an example of a screen displaying a database of turn-on information of a traffic light at an intersection in a direction A for each time according to an embodiment of the present disclosure.

FIG. 5 illustrates an example of a screen displaying a database of turn-on information of a traffic light at an intersection in a direction C for each time according to an embodiment of the present disclosure.

FIG. 6 illustrates an example of a screen displaying a database of turn-on information of a traffic light at an intersection in a direction D for each time according to an embodiment of the present disclosure.

FIG. 7 illustrates an example of a screen displaying a database of a turn-on state of a traffic light at an intersection in a direction A (in seconds) according to an embodiment of the present disclosure.

FIG. 8A and FIG. 8B illustrate an example of a screen displaying a database of a turn-on time of a traffic light at a left-turn intersection during driving in a direction A according to an embodiment of the present disclosure.

FIG. 9A and FIG. 9B illustrate an example of a screen displaying a database of a turn-on time of a traffic light at an unprotected right-turn intersection during driving in a direction A according to an embodiment of the present disclosure.

FIG. 12 and FIG. 13 illustrate an example of a screen providing traffic light information of an intersection according to an embodiment of the present disclosure.

DETAILED DESCRIPTION OF THE EMBODIMENTS

Figure 1:
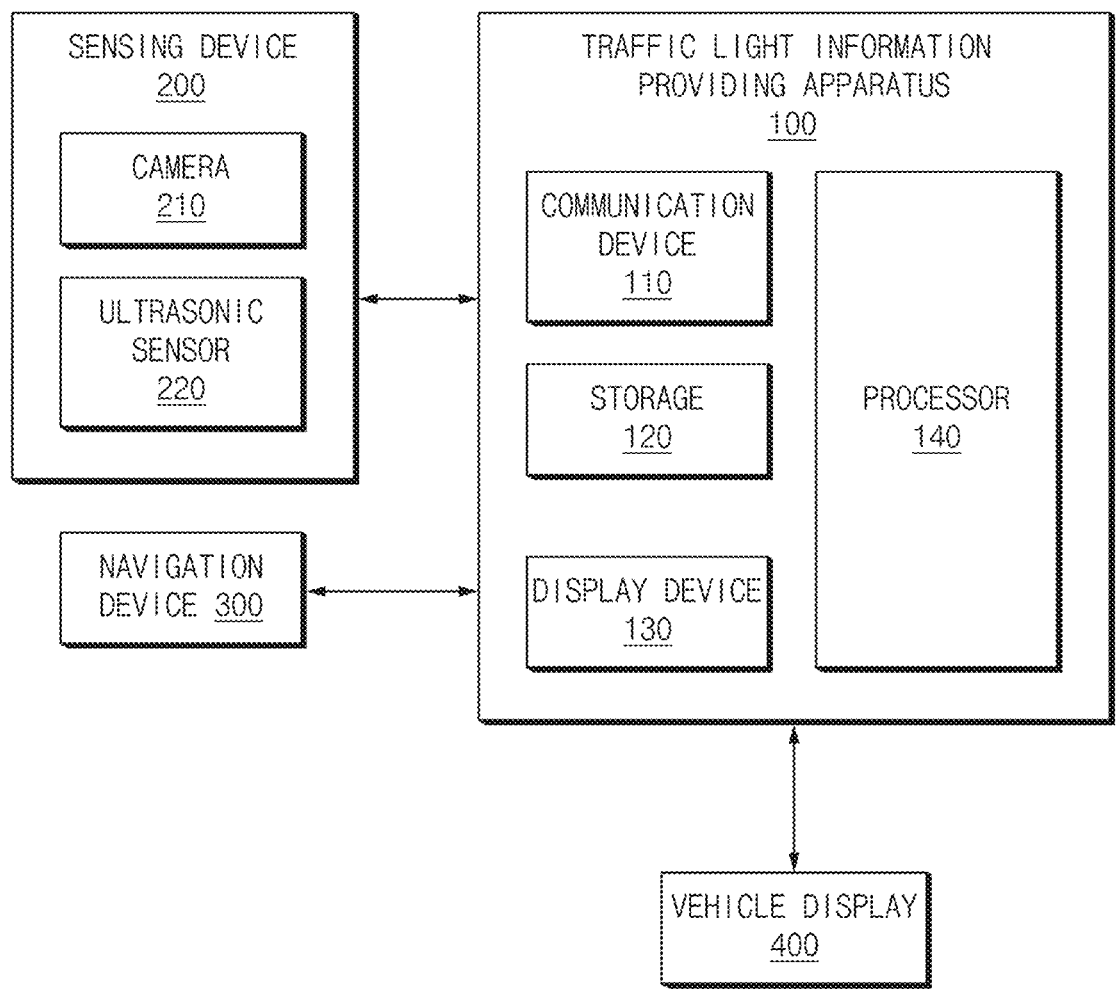
FIG. 1 illustrates a block diagram showing a configuration of a vehicle system including a traffic light information providing apparatus according to an embodiment of the present disclosure.

Hereinafter, some embodiments of the present disclosure are described in detail with reference to the drawings. It should be noted that in adding reference numerals to constituent elements of each drawing, the same or equivalent constituent elements have the same reference numerals as possible even though they are indicated on different drawings. In addition, in describing embodiments of the present disclosure, where it has been determined that detailed descriptions of related well-known configurations or functions may interfere with understanding of the embodiments of the present disclosure, the detailed descriptions thereof have been omitted.

In describing constituent elements according to an embodiment of the present disclosure, terms such as first, second, A, B, (a), and (b) may be used. These terms are only for distinguishing the constituent elements from other constituent elements and the nature, sequences, or orders of the constituent elements are not limited by the terms. In addition, all terms used herein including technical scientific terms have the same meanings as those which are generally understood by those having ordinary skill in the technical field to which the present disclosure pertains (i.e., those having ordinary skill in the art) unless the terms are differently defined. Terms defined in a generally used dictionary should be construed to have meanings matching those in the context of a related art and should not be construed to have idealized or excessively formal meanings unless the terms are clearly defined in the present specification. When a component, device, element, or the like of the present disclosure is described as having a purpose or performing an operation, function, or the like, the component, device, or element should be considered herein as being "configured to" meet that purpose or to perform that operation or function. Further, as used herein, 'turn-on' or 'turning on' of a traffic light is intended to mean a light change of a traffic light. In other words, this may mean when a traffic light 'turns', i.e., changes from red to green, from green to yellow, from yellow to red, or the like. Also, 'turn-on remaining time' as used herein is intended to mean the remaining time before a traffic light changes from a current color to another color.

Hereinafter, embodiments of the present disclosure are described in detail with reference to FIGS. 1-13.

FIG. 1 illustrates a block diagram showing a configuration of a vehicle system including a traffic light information providing apparatus according to an embodiment of the present disclosure.

Referring to FIG. 1, the vehicle system according to the embodiment of the present disclosure may include a traffic information providing apparatus 100, a sensing device 200, a navigation device 300, and a vehicle display.

The traffic light information providing apparatus 100 according to an embodiment of the present disclosure may be implemented inside a vehicle. In this case, the traffic light information providing apparatus 100 may be integrally formed with internal control units of the vehicle or may be implemented as a separate device to be connected to control units of the vehicle by a separate connection means.

The traffic light information providing apparatus 100 may convert turn-on information of a traffic light of an intersection in front of the vehicle into a database during driving of the vehicle. The traffic light information providing apparatus 100 may pre-provide a user with traffic light information at an intersection or traffic light information at a crosswalk in a rotation direction before or while passing through the intersection based on the converted database of the turn-on information of the intersection traffic light.

To this end, the traffic light information providing apparatus 100 may include a communication device 110, a storage 120, a display device 130, and a processor 140.

The communication device 110 is a hardware device implemented with various electronic circuits to transmit and receive signals through a wireless or wired connection and may transmit and receive information based on in-vehicle devices and in-vehicle network communication techniques. As an example, the in-vehicle network communication techniques may include controller area network (CAN) communication, local interconnect network (LIN) communication, flex-ray communication, and the like. In addition, the communication device 110 may perform communication by using a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 110 may receive a result sensed from the sensing device 200 and may transmit information such as image information and traffic information to the vehicle display 400.

The storage 120 may store sensing results of the sensing device 200 and data and/or algorithms required for the processor 140 to operate, and the like.

As an example, the storage 120 may store intersection information received from the navigation device 300. In addition, the storage 120 may store photographed image data of the traffic light of the intersection in front and the traffic light of the crosswalk and detecting information of pedestrians at a crosswalk of the intersection.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

Figure 2A:
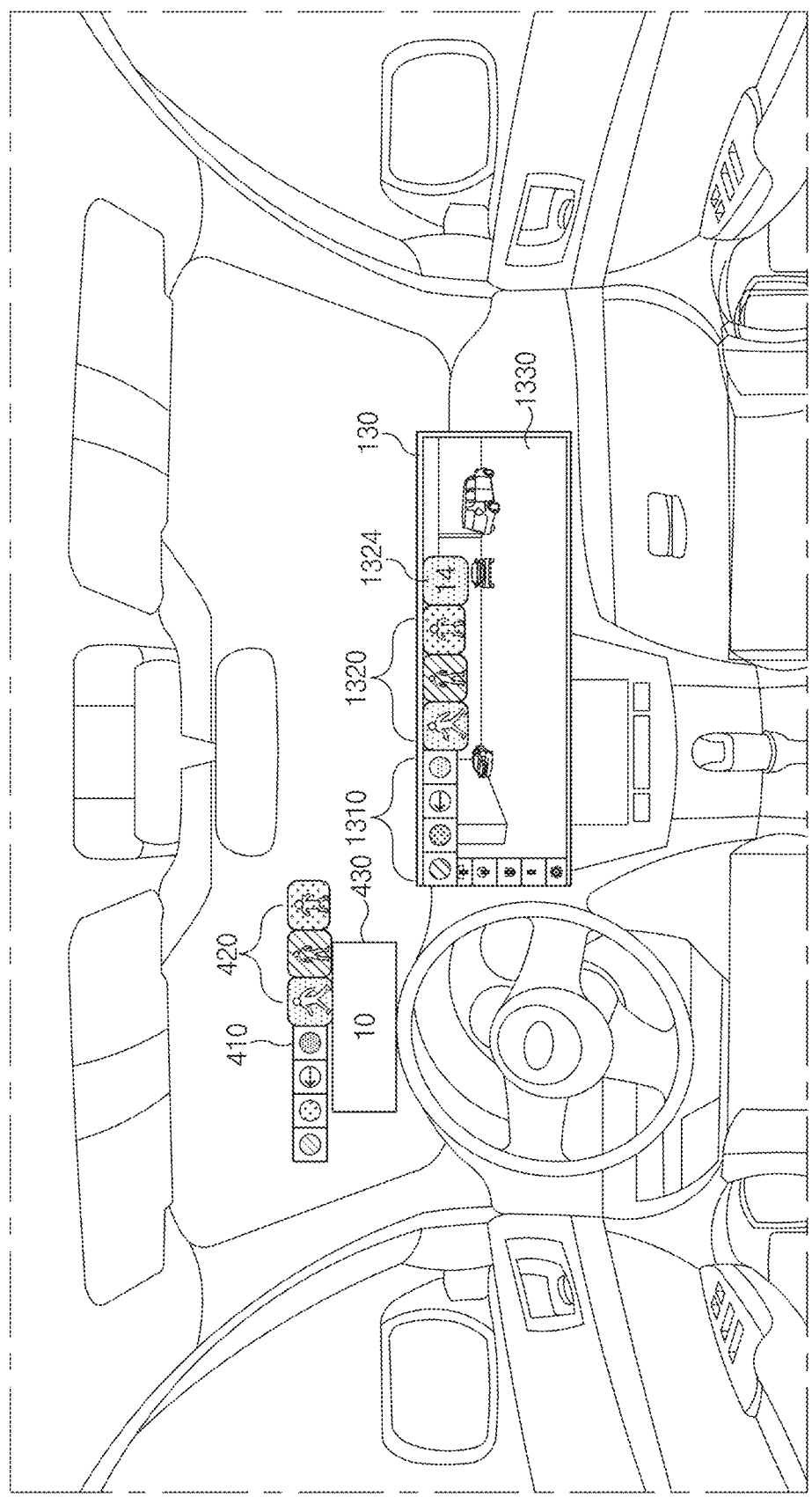
FIG. 2A and FIG. 2B illustrate an example of a screen displaying traffic light information according to an embodiment of the present disclosure.
Figure 2B:
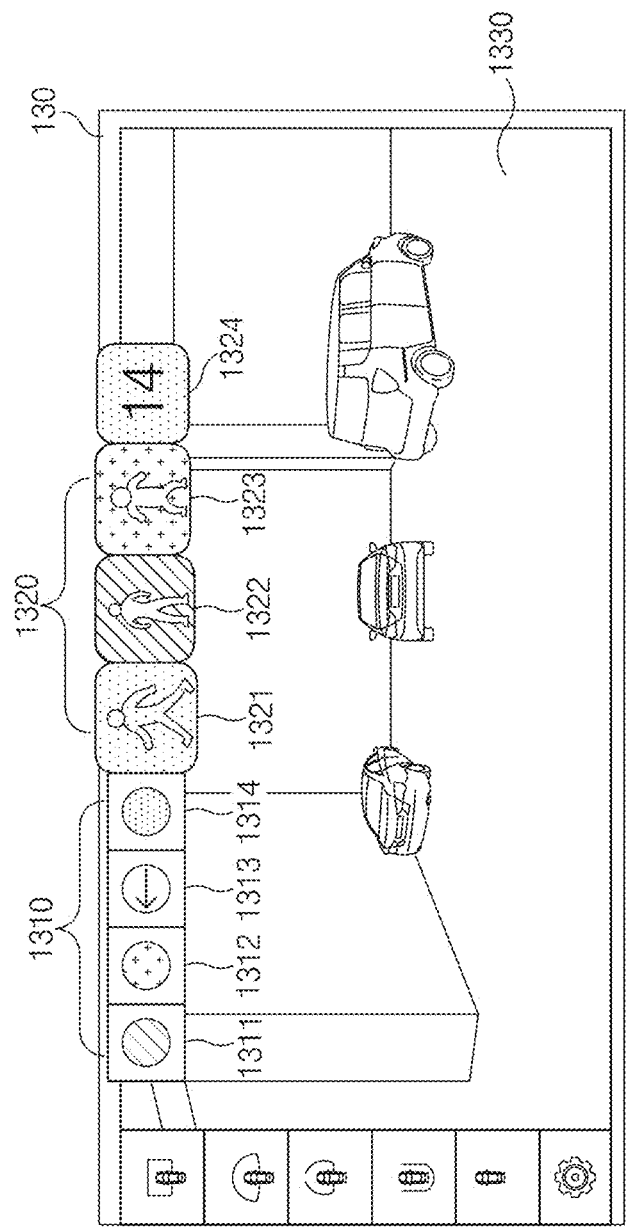

The display device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. In addition, the input means may include a soft key implemented on the display. FIG. 2A and FIG. 2B illustrate an example of a screen displaying traffic light information according to an embodiment of the present disclosure. Referring to FIG. 2A, the display device 130 may display a front or side image 1330, an intersection traffic light 1310 at one side thereof, a virtual traffic light 1320, a remaining turn-on time 1324 of a current turned-on color of the intersection traffic light, and the like. Referring to FIG. 2B, the intersection traffic light 1310 may include a red image 1311, an orange or yellow image 1312, a left-turn signal 1313, a green image 1314, and the like positioned in sequence. The virtual traffic light or crosswalk light 1320 may include a green image 1321, an orange image 1322, a red image 1323 positioned in sequence, and a remaining time image 1324. A corresponding color may be turned on depending on a current situation. Herein, an example in which the intersection traffic light 1310 and the virtual traffic light 1320 are arranged in sequence is disclosed. However, the present disclosure is not limited thereto and may be arranged and displayed in various positions with good visibility.

The output device may include a display and may also include a voice output means such as a speaker. In this case, when a touch sensor formed of a touch film, a touch sheet, or a touch pad is provided on the display, the display may operate as a touch screen and may be implemented in a form in which an input device and an output device are integrated. In the present disclosure, an output means may output a turn-on color of the intersection traffic light, a remaining turn-on time, a color of the crosswalk traffic light, and a color of the virtual traffic light. In addition, the output means may output a warning sound or a call for attention when a pedestrian is detected.

As an example, the display device 130 may be implemented as a display apparatus such as a surround view monitoring (SVM) device, a navigation device, an audio video navigation (AVN), a telematics terminal, and an around view monitoring (AVM) device. In this case, the display may include at least one of a liquid crystal display (LCD), a thin film transistor liquid crystal display (TFT LCD), an organic light emitting diode display (OLED display), a flexible display, a field emission display (FED), and a 3D display.

The processor 140 may be electrically connected to the communication device 110, the storage 120, the display device 130, and the like, may electrically control each component, and may be an electrical circuit that executes software commands. Thus, various data processing and calculations described below may be performed.

The processor 140 may process signals transferred between constituent elements of the traffic light information providing apparatus 100. The processor 140 may be, e.g., an electronic control unit (ECU), a micro controller unit (MCU), or other subcontrollers mounted in the vehicle.

The processor 140 may convert turn-on information of a traffic light at an intersection in front, which is acquired through the camera 210 each time the vehicle is driven, into a database in the storage 120. Accordingly, the processor 140 enables a user to proactively cope with a dangerous situation by accumulating turn-on information of the intersection traffic light, calculating a remaining turn-on time and a turn-on or change cycle of the intersection traffic light based on the accumulated turn-on information of the intersection traffic light, and by pre-providing a user with the remaining turn-on time and a turn-on color of the intersection traffic light before or while passing through the intersection.

Figure 3A:
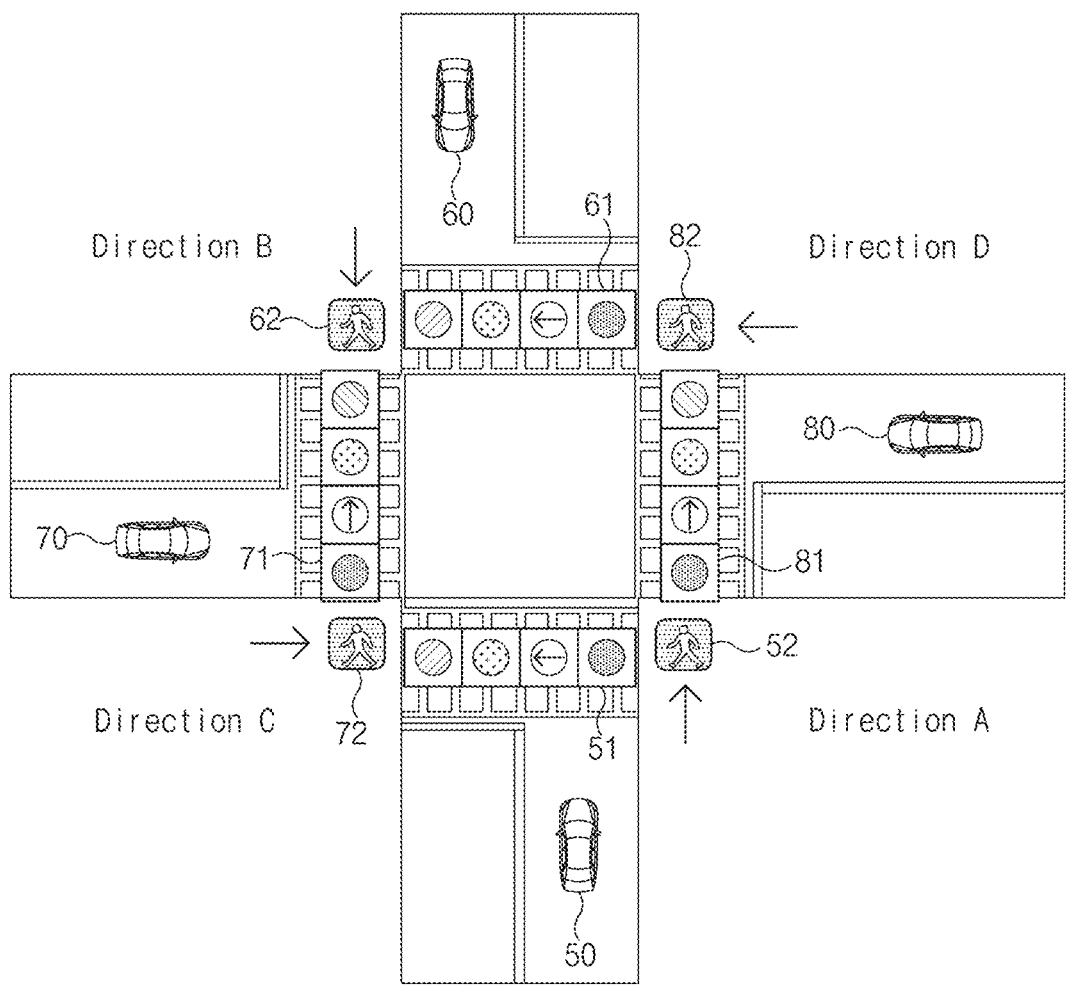
FIG. 3A, FIG. 3B, and FIG. 3C illustrate views for describing a process of creating a database of traffic light information according to an embodiment of the present disclosure.
Figure 3B:
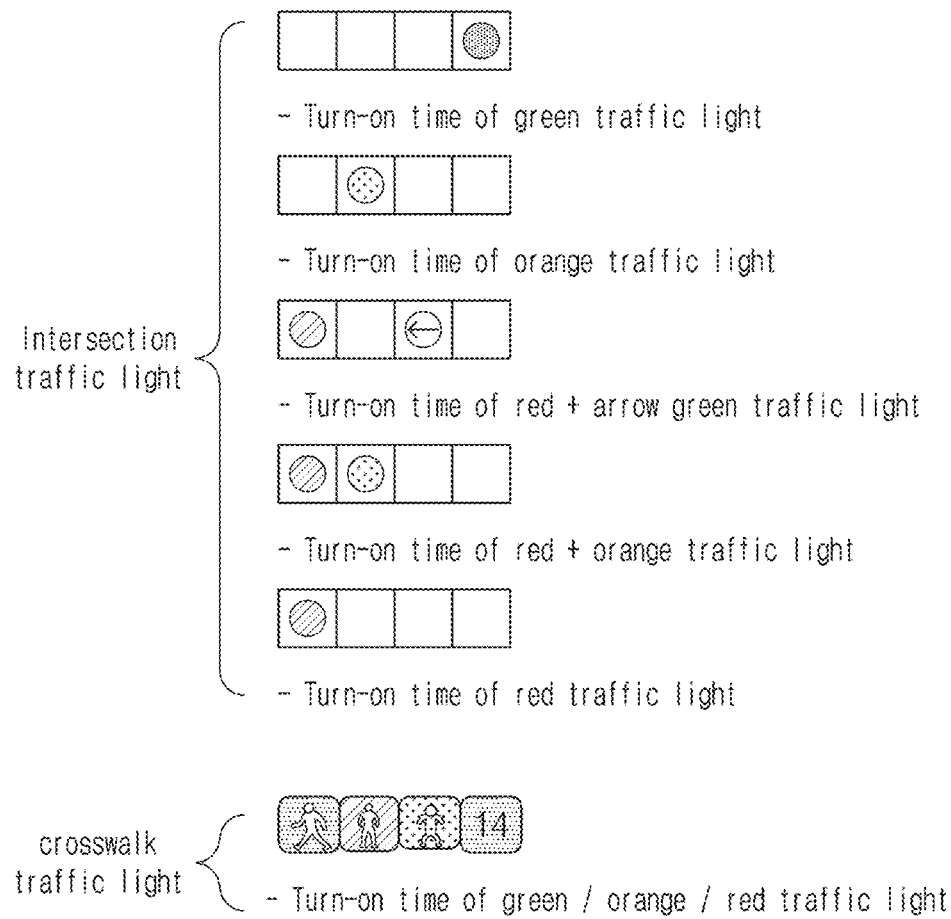
Figure 3C:
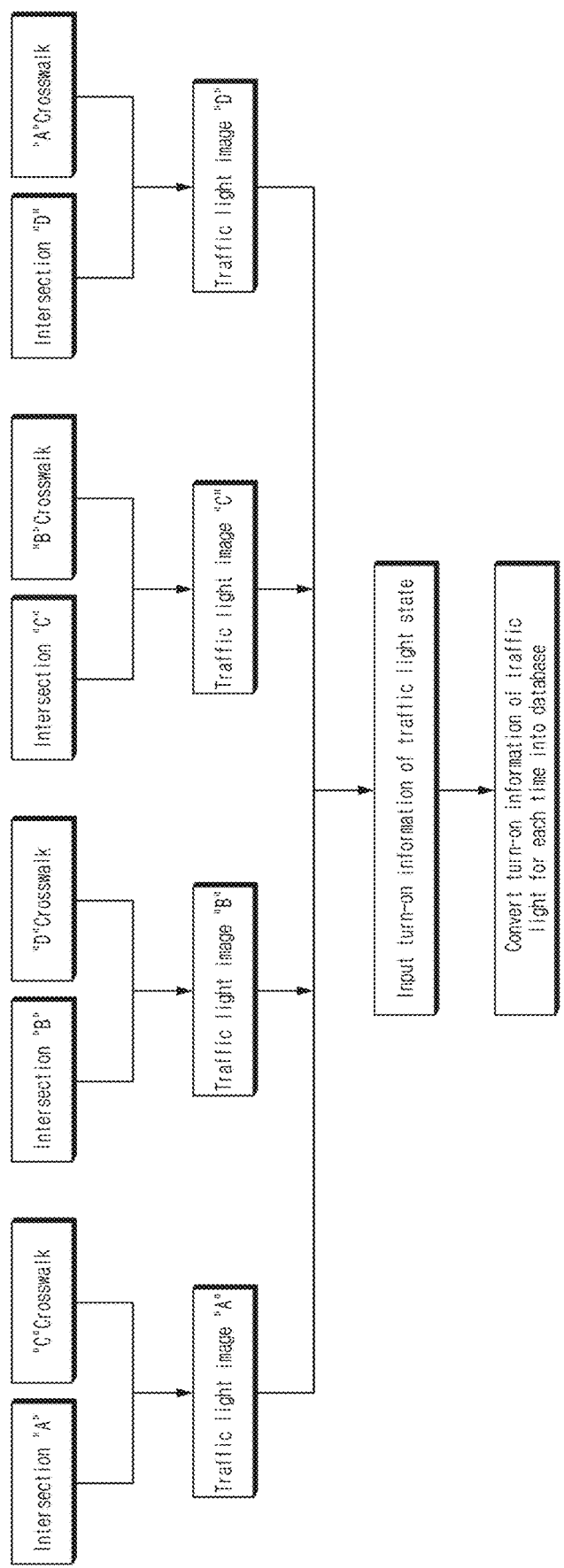

When intersection traffic lights 51, 61, 71, and 81 exist and crosswalk traffic lights 52, 62, 72, and 82 exist as illustrated in FIG. 3A, the processor 140 obtains turn-on times for each color of the traffic lights 51, 61, 71, and 81 and the crosswalk traffic lights 52, 62, 72, and 82 as illustrated in FIG. 3B and inputs the obtained turn-on information for each traffic light and converts it into a database for each time as illustrated in FIG. 3C. FIG. 3A, FIG. 3B, and FIG. 3C illustrate views for describing a process of creating a database of traffic light information according to an embodiment of the present disclosure.

The processor 140 may accumulate and store the turn-on information of the intersection traffic light for each time to convert it into a database. Subsequently, the processor 140 may calculate the turn-on information of the intersection traffic light and calculate the remaining turn-on time and the turn-on cycle of the intersection traffic light based on the turn-on information of the intersection traffic light. In this case, the turn-on information of the intersection traffic light may include colors of the intersection traffic light and a turn-on time for each color of the intersection traffic light.

The processor 140 may estimate a turn-on or change cycle of the intersection traffic light in a second direction that is opposite to a first direction of the intersection based on the turn-on information of the intersection traffic light in a first direction.

In addition, the processor 140 may calculate a turn-on or change cycle of the intersection traffic light in a third direction that is perpendicular to the first direction by calculating a time delay difference between turn-on times of the intersection traffic light in the third direction based on the turn-on information of the intersection traffic light in the first direction of the intersection.

At the intersection as illustrated in FIG. 3A, vehicles 50, 60, 70, and 80 traveling in directions A, B, C, and D may respectively take pictures of the traffic lights 51, 61, 71, and 81 of the intersection in a travel direction to obtain image data and may convert a turn-on time of the intersection traffic light for each time and a turn-on color of the traffic light for each time based on the image data. Accordingly, the processor 140 mounted in each of the vehicles 50, 60, 70, and 80 may acquire a turn-on or change cycle, a remaining time of the traffic light, and the like based on the turn-on time of the traffic light for each time.

FIG. 4 illustrates an example of a screen showing a database of turn-on information of a traffic light at an intersection in a direction A for each time according to an embodiment of the present disclosure. FIG. 5 illustrates an example of a screen showing a database of turn-on information of a traffic light at an intersection in a direction C for each time according to an embodiment of the present disclosure. FIG. 6 illustrates an example of a screen showing a database of turn-on information of a traffic light at an intersection in a direction D for each time according to an embodiment of the present disclosure.

A turn-on or change cycle of an intersection traffic light 51 in a direction A and a turn-on or change cycle of an intersection traffic light 61 in a direction B may be the same. Accordingly, the turn-on or change cycle of the intersection traffic light 61 in the direction B may be obtained by using the turn-on or change cycle of the intersection traffic light 51 in the direction A.

In addition, a turn-on or change cycle of an intersection traffic light 71 in a direction C and a turn-on or change cycle of an intersection traffic light 81 in a direction D may be the same. Accordingly, the turn-on or change cycle of the intersection traffic light 81 in the direction D may be obtained by using the turn-on or change cycle of the intersection traffic light 71 in the direction C.

Accordingly, the turn-on or change cycle of the intersection traffic light 51 in the direction A and the turn-on or change cycle of the intersection traffic light 61 in the direction B may calculated equally. The turn-on or change cycle of the intersection traffic light 71 in the direction C and the turn-on or change cycle of the intersection traffic light 81 in the direction D may calculated equally.

In addition, it can be seen that the turn-on or change cycle of the intersection traffic light 51 in the direction A and the intersection traffic light 61 in the direction B is delayed for a certain period of time compared to the turn-on or change cycle of the intersection traffic light 71 in the direction C and the intersection traffic light 81 in the direction D.

The processor 140 may calculate a turn-on or change cycle of each intersection traffic light based on the accumulated turn-on information of each intersection traffic light and may obtain delay information of a turn-on or change cycle of each intersection traffic light. Accordingly, it is possible to estimate turn-on or change cycles of the other intersection traffic lights based on the turn-on or change cycle of one intersection traffic light. For example, when the turn-on or change cycle of the intersection traffic light 51 in the direction A is 120 seconds, the intersection traffic light 61 in the direction B may be 120 seconds and it can be seen that the turn-on or change cycle of the intersection traffic light 71 in the direction C is delayed by 70 seconds from the turn-on or change cycle of the intersection traffic light 51 in the direction A.

For example, the turn-on time may be green (50 sec), left turn (15 sec), and red (50 sec) for each color. In FIG. 4, in the case where the intersection traffic light 51 is green when the vehicle 50 passes the intersection, the vehicle 50 travels as it is without stopping and thus a turn-on time of green in captured image data is short. On the other hand, in the case where the intersection traffic light 51 is red when the vehicle 50 passes the intersection, the vehicle 50 stops at an intersection stop line. Thus, the vehicle 50 continues to photograph the intersection traffic light 51 while stopping until the intersection traffic light 51 is green and grasps the turn-on or change cycle of the intersection signal light 51 based on captured image data.

When the intersection signal light 51 in the direction A and the intersection traffic lights 71 and 81 in the direction C and in the direction D are periodically turned on with a time difference of 70 sec, the processor 140 may calculate the turn-on time of the intersection signal light 51 in the direction A by delaying the turn-on times of the intersection traffic lights 71 and 81 in the direction C and in the direction D by 70 sec.

As such, the processor 140 collects information of the intersection traffic lights in the directions A, B, C, and D to convert it into a database. In addition, the processor 140 may check time-by-time information by using turn-on time acquisition information of the intersection traffic lights in the directions A, B, C, and D or by estimating turn-on times of the traffic lights when time-by-time driving information is not acquired.

FIG. 7 illustrates an example of a screen displaying a database of a turn-on state of a traffic light at an intersection in a direction A per second according to an embodiment of the present disclosure.

For example, as shown in FIG. 7, the turn-on time of the intersection signal light 51 in the direction A is from 06:00:01 to 06:01:59 as one cycle. The turn-on time of the intersection traffic light in the direction B has a same cycle as that of the intersection traffic light 61 in the direction A and the intersection traffic lights in the directions C and D are turned on with a delay by 70 sec.

Figure 8A:
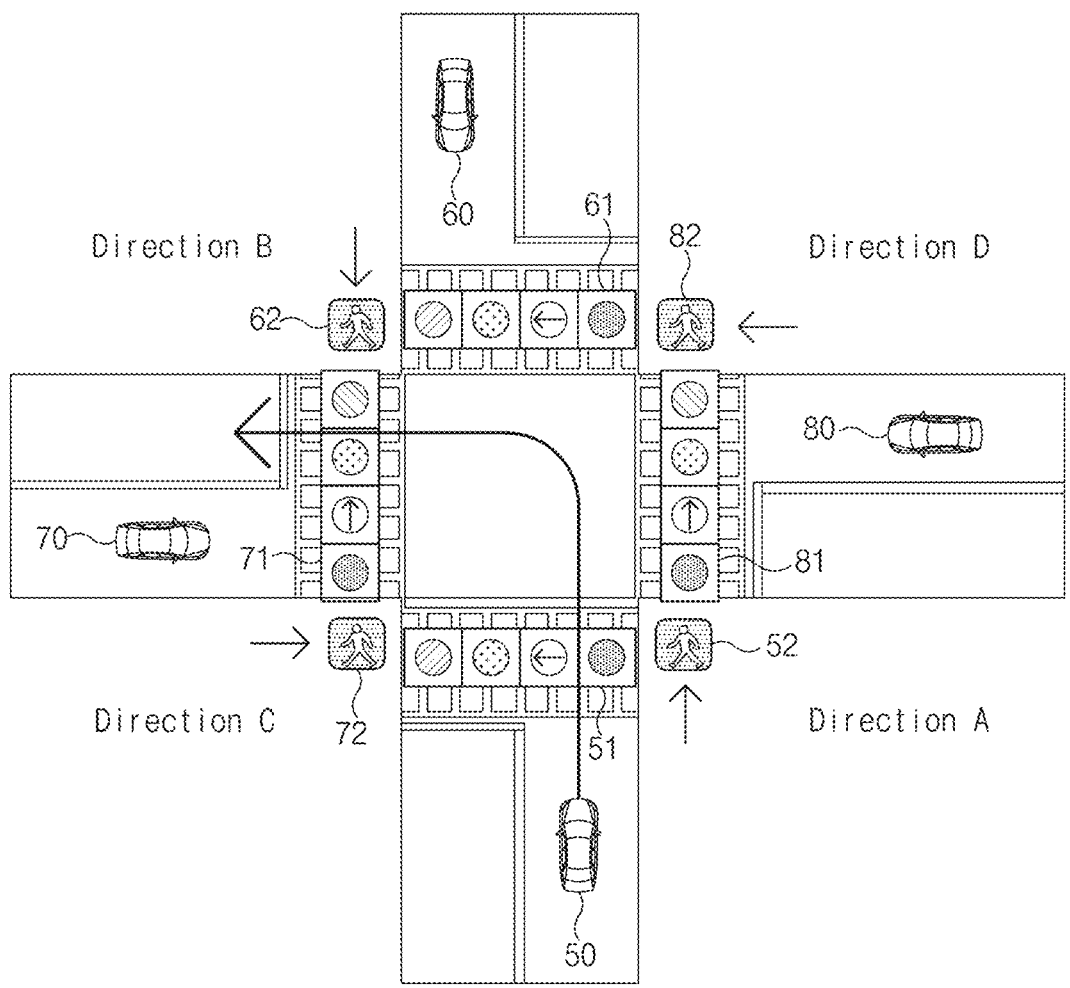

The processor 140 may generate a virtual traffic light based on crosswalk traffic light information in a right or left turn direction and pedestrian detection information when a vehicle turns right or left at an intersection. FIG. 8A and FIG. 8B illustrate an example of a screen displaying a database of a turn-on time of a traffic light at a left-turn intersection in a direction A according to an embodiment of the present disclosure. Referring to FIG. 8A, when the vehicle 50 turns left, image data is acquired by photographing the left-turn crosswalk traffic light 62. Turn-on times of the intersection signal light 51 and the crosswalk traffic light 62 are converted into databases for each time as illustrated in FIG. 8B. Accordingly, the processor 140 may compute a correlation between turn-on time points by calculating a turn-on or change cycle based on a traffic light turn-on time per each time and comparing it with the intersection traffic light in the direction A. In this case, turn-on or change cycles of crosswalk traffic lights 52, 62, 72, and 82 may be respectively calculated by using turn-on times of intersection traffic lights. For example, the crosswalk traffic light 72 may turn on green for 30 seconds from a start of green light of the intersection traffic light 51 and a turn-on remaining time of the green light may be displayed.

The processor 140 may display the virtual traffic light in orange together with the intersection traffic light on the display device and may output a call for attention when the vehicle turns right, the crosswalk traffic light in the traveling direction is green, and a pedestrian crossing the crosswalk is not detected.

The processor 140 may control the display device 130 to display the virtual traffic light in green together with the intersection traffic light when the vehicle turns right, the crosswalk traffic light in the traveling direction is red, and a pedestrian crossing the crosswalk is not detected.

The processor 140 may control the virtual traffic light to be displayed on the display device 130 in red when the vehicle turns right, the crosswalk traffic light in the traveling direction is green or red, and a pedestrian crossing the crosswalk is detected.

The processor may control a warning sound to be outputted or the virtual traffic light to be flashed and displayed when the virtual traffic light is displayed in red.

Figure 9A:
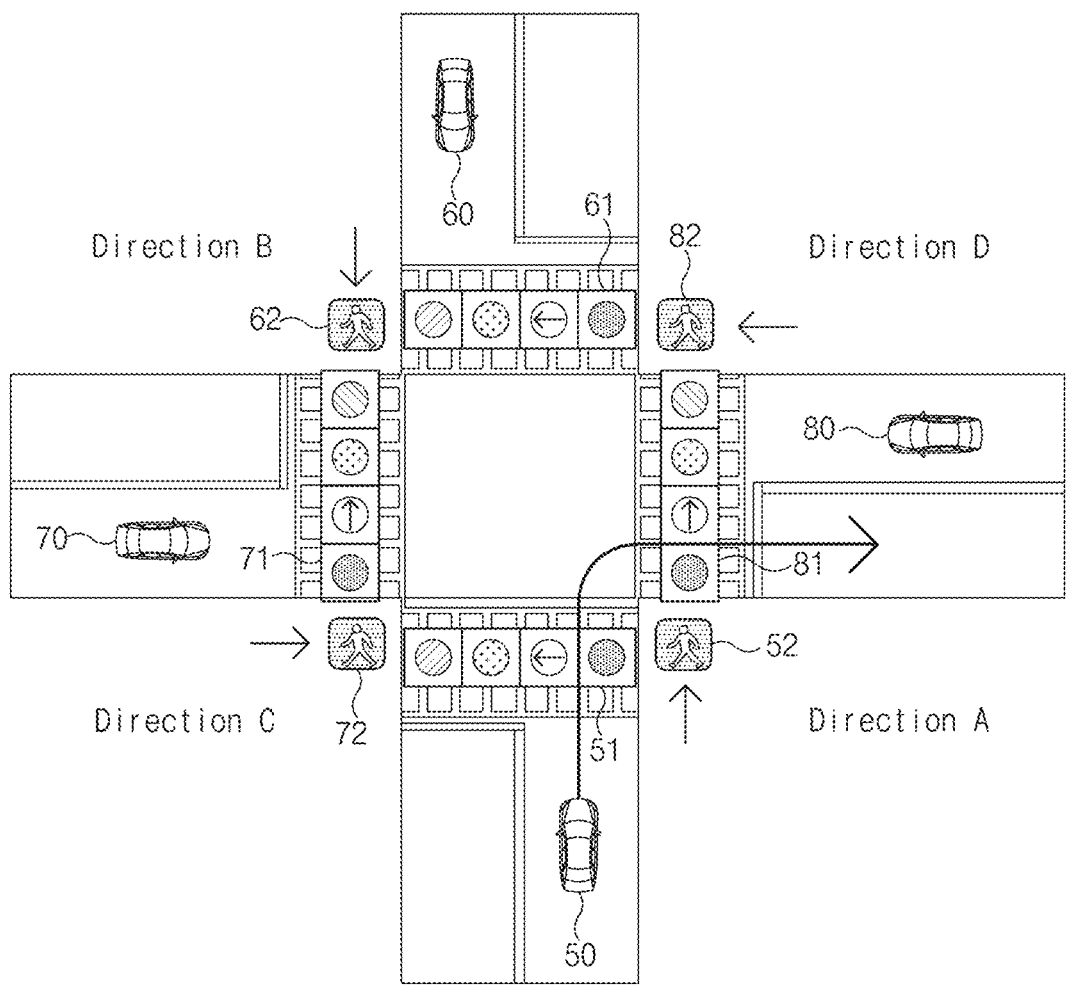

FIG. 9A and FIG. 9B illustrate an example of a screen displaying a database of a turn-on time of a traffic light at an unprotected right-turn intersection in a direction A according to an embodiment of the present disclosure.

Referring to FIG. 9A, when performing an unprotected right-turn, the vehicle 50 displays crosswalk traffic light information during the right turn. The processor 140 may convert turn-on times of the crosswalk traffic lights 82 and 52 in the direction D and the direction A into databases as illustrated in FIG. 9B by acquiring image data of the traffic light in the direction B.

As illustrated in FIG. 9B, the processor 140 may calculate the turn-on or change cycle of the left-turn crosswalk traffic light 52 in the direction A by using the turn-on time of the intersection traffic light 81 in the direction D for each time. The processor 140 may calculate the turn-on time of the crosswalk traffic light 82 in the direction D by using the turn-on time of the crosswalk traffic light 82 in the D direction. For example, a green light of the left-turn crosswalk traffic light 51 in the direction A is turned on for 30 seconds from a start of a green light of the intersection traffic light 81 in the direction D. Also, the crosswalk traffic light 82 in the direction D is turned on for 30 seconds from a start of the green light of the intersection traffic light 61 in the direction B. As a result, the turn-on time of each crosswalk traffic light may be known by using the turn-on time of each intersection traffic light.

The processor 140 may display a front view and a side view together when the vehicle turns right or left, may display an intersection traffic light and a virtual traffic light at one side, may change synchronization by an adjustment time of any artificial adjustment when the artificial adjustment occurs or may recalculate a turn-on cycle (1 cycle) of a traffic light, and may transmit an error signal during that time such that traffic light information is not displayed.

The processor 140 may induce safe driving by changing a color of the traffic light, blinking it, or outputting a sound as a concept of attracting the attention of a driver at a time point when the intersection traffic light is changed.

The sensing device 130 may detect image data photographing an intersection traffic light and a crosswalk traffic light in front and may detect whether the presence or absence of a pedestrian walking at a crosswalk.

To this end, the sensing device 130 includes a camera 210 (image acquisition device) and an ultrasonic sensor 220 (pedestrian detection device).

The camera 210 photographs an intersection traffic light and a crosswalk traffic light and transmits turn-on image data of the traffic light to the traffic light information providing apparatus 100.

The ultrasonic sensor 220 detects a pedestrian at an intersection crosswalk and transfers it to the traffic light information providing apparatus 100.

The navigation device 300 transmits map information including intersection information to the traffic light information providing apparatus 100.

The display device 400 may be implemented as a head-up display (HUD), a cluster, an audio video navigation (AVN), or a human machine interface (HM), a human machine interface (HMI). As illustrated in FIG. 2A, information related to intersection traffic lights, remaining times of the intersection traffic lights, and crosswalk traffic lights may be displayed.

Referring to FIG. 2A, as the vehicle display 400, the head-up display may display an intersection traffic light 410, a virtual traffic light 420, and a turn-on remaining time 430 of a currently turned-on color of the intersection traffic light 410.

Figure 10:
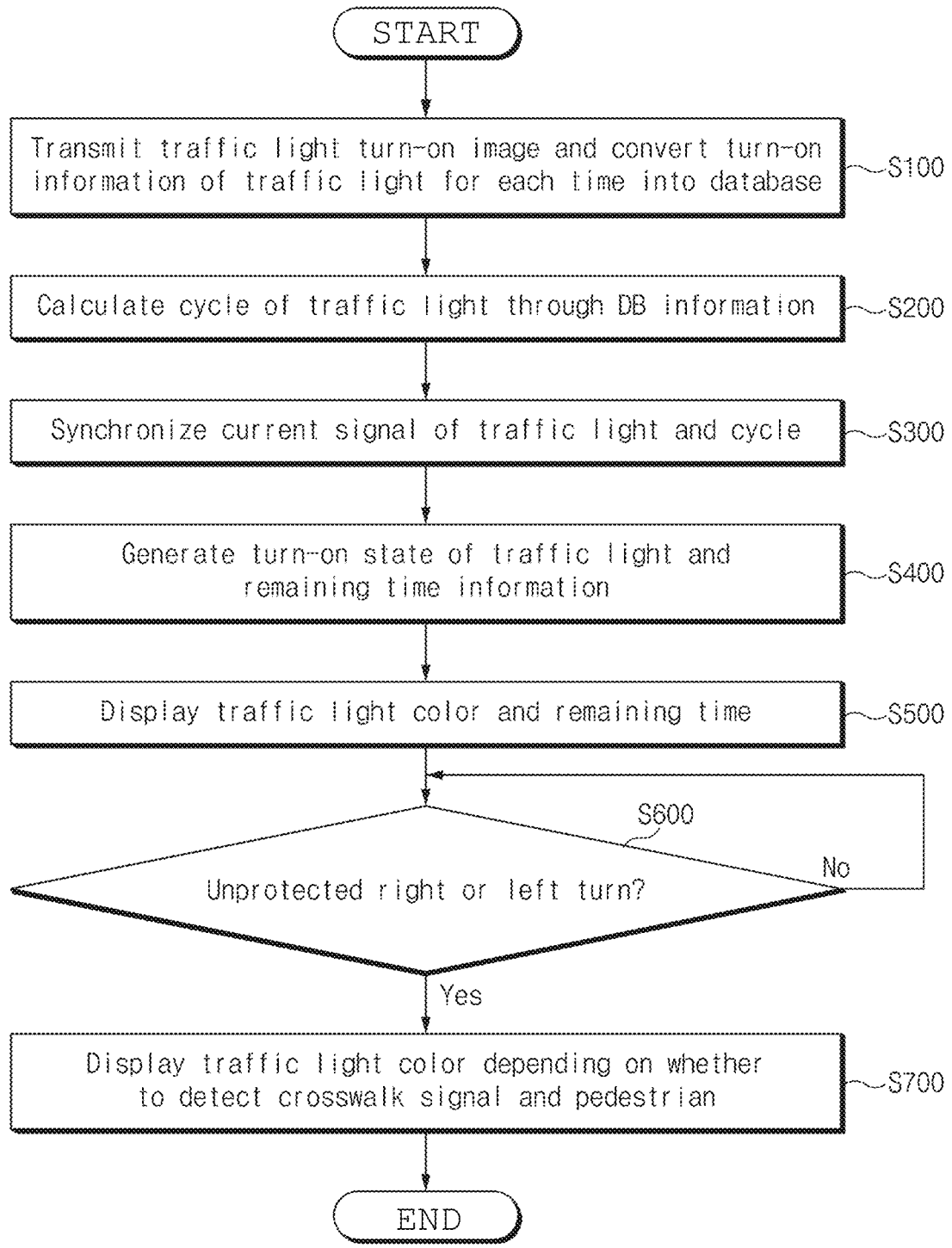
FIG. 10 illustrates a flowchart for describing a traffic light information providing method according to an embodiment of the present disclosure.

Hereinafter, a traffic light information providing method according to an embodiment of the present disclosure is described in detail with reference to FIG. 10. FIG. 10 illustrates a flowchart for describing a traffic light information providing method according to an embodiment of the present disclosure.

Hereinafter, it is assumed that the traffic light information providing apparatus 100 of FIG. 1 performs the processes of FIG. 10. In addition, in the description of FIG. 10, operations described as being performed by a device may be understood as being controlled by the processor 140 of the traffic light information providing apparatus 100.

Referring to FIG. 10, the traffic light information providing apparatus 100 converts a turn-on time and a turn-on color for each intersection traffic light for each time into databases based on image data of intersection traffic lights and crosswalk traffic lights, which are photographed each time a vehicle drives through the intersection (S100). For example, in the case where there are four intersection traffic lights as shown in FIG. 3A, when the vehicle 50 proceeds in the direction A, a turn-on time of the intersection traffic light 51 may be converted into a database for each time and stored in the storage 120 as illustrated in FIG. 4. Meanwhile, the vehicle 60 may obtain turn-on information of the intersection traffic light 61 and convert it into a database. The vehicle 70 may also obtain turn-on information of the intersection traffic light 71 and convert it into a database. The vehicle 80 may further obtain turn-on information of the intersection traffic light 81 and convert it into a database. As such, the turn-on information of each of the intersection traffic light 51, 61, 71, and 81 may be accumulated and stored based on the image data acquired each time the vehicle drives through the intersection.

The traffic light information providing apparatus 100 may calculate a cycle of the traffic light 51 by using the accumulated turn-on information of the intersection traffic light 51 (S200). For example, as illustrated in FIG. 4, when the intersection traffic light 51 turns to orange or yellow, the vehicle 50 stops in front of the intersection traffic light and continues to photograph the intersection traffic light 51 while stopping until the intersection traffic light 51 turns orange-→left turn signal+green→orange→red→green and sequentially stores turn-on time information when it is orange, turn-on time information when it is a left turn signal, turn-on time information when it is orange, and turn-on time information when it is red as shown in a screen 41.

Accordingly, one cycle of the intersection traffic light 51 may be provided until it becomes orange→left turn signal+green→orange→red. For example, in the case of 50 seconds of green, 15 seconds of left turn, 50 seconds of red, and 5 seconds of orange, one cycle of a corresponding intersection traffic light may be 120 seconds and one cycle of such a traffic light may be different for each traffic light.

The traffic light information providing apparatus 100 synchronizes turn-on cycles of a traffic light signal of an intersection in front of a currently driving road and a corresponding intersection traffic light based on a database (S300).

Then, the signal light information providing apparatus 100 generates information related to a turn-on color and a remaining time of the intersection traffic light in front of the currently driving road through the synchronization (S400). The signal light information providing apparatus 100 also outputs and displays the color information of the intersection traffic light and the remaining time on the display device 130 and the vehicle display 400 (S500). In this case, the traffic light information providing apparatus 100 may transmit and display an image view that is matched with a turn-on state of the intersection traffic light in front to the display device 130 or the vehicle display 400.

Subsequently, the traffic light information providing apparatus 100 determines whether the vehicle intends to make an unprotected right or left turn at the intersection (S600). When the vehicle attempts to make unprotected right or left turn at the intersection, the traffic light information providing apparatus 100 generates and displays a virtual traffic light depending on whether or not to detect a crosswalk traffic light or a pedestrian crossing a crosswalk (S700). In this case, the traffic light information providing apparatus 100 may determine a will to turn left or right depending on left and right turn on and off of a direction indicator.

Figure 11A:
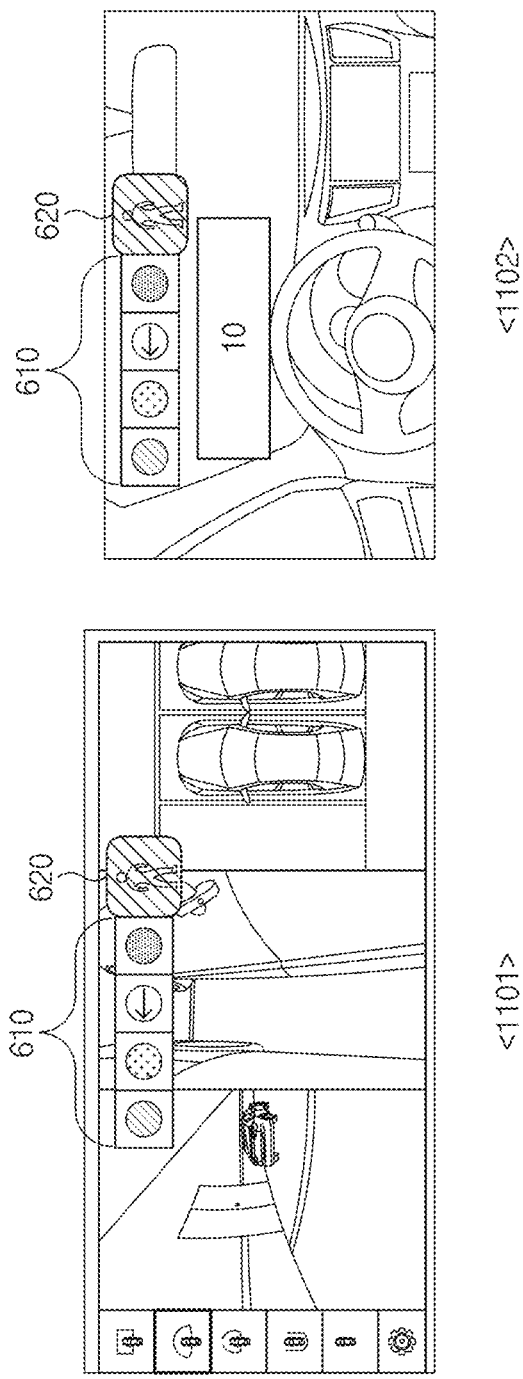
FIG. 11A, FIG. 11B, and FIG. 11C illustrate an example of a screen displaying turn-on information of a traffic light at an intersection according to an embodiment of the present disclosure.

For example, as illustrated in FIG. 11A, in the case where the crosswalk traffic light is green when the vehicle turns right and a pedestrian crossing the crosswalk is detected, an intersection traffic light 610 and a virtual red traffic light 620 may be displayed together. A reference numeral 1101 indicates an example of a screen displayed on the display device 130 and a reference numeral 1102 is an example of a screen displayed on a vehicle head-up display.

Figure 11B:
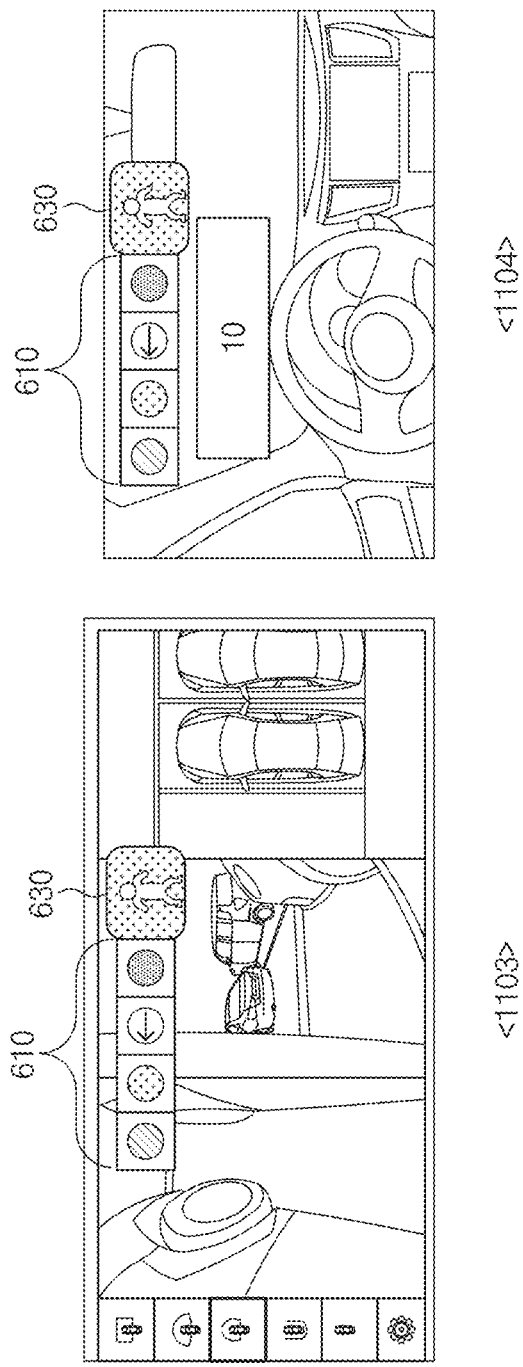

In addition, as illustrated in FIG. 11B, in the case where the crosswalk traffic light is green when the vehicle turns right and a pedestrian crossing the crosswalk is not detected, the intersection traffic light 610 and a virtual orange traffic light 630 may be displayed together. A reference numeral 1103 indicates an example of a screen displayed on the display device 130 and a reference numeral 1104 is an example of a screen displayed on a vehicle head-up display.

Figure 11C:
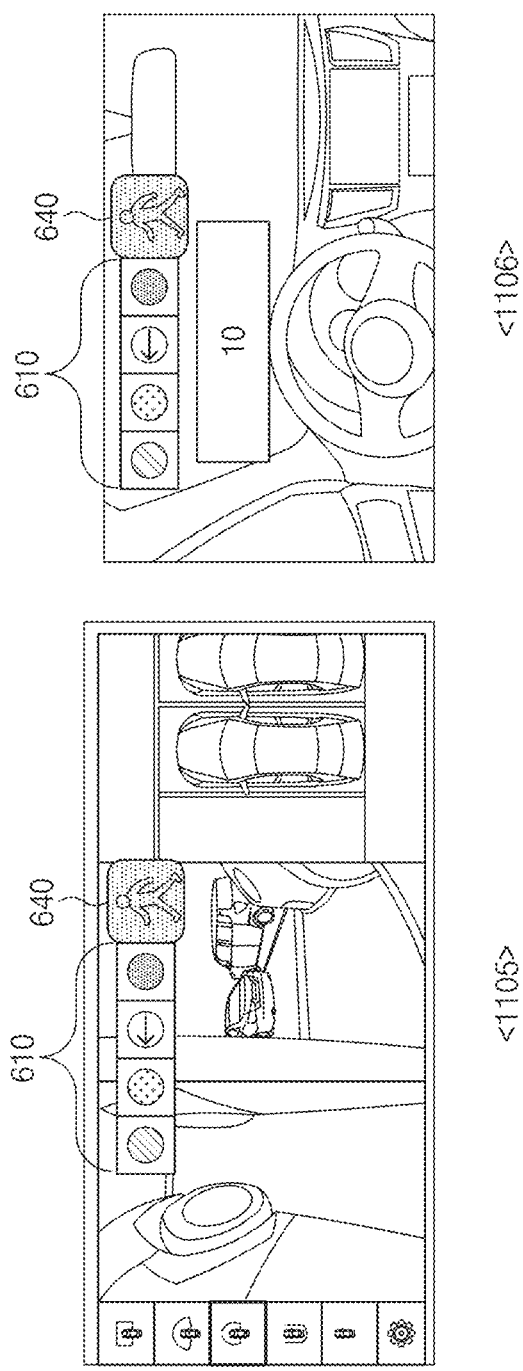

In addition, as illustrated in FIG. 11C, in the case where the crosswalk traffic light is red when the vehicle turns right and a pedestrian crossing the crosswalk is not detected, the intersection traffic light 610 and a virtual green traffic light 640 may be displayed together. A reference numeral 1105 indicates an example of a screen displayed on the display device 130 and a reference numeral 1106 is an example of a screen displayed on a vehicle head-up display.

In addition, in the case where the crosswalk traffic light is red when the vehicle turns right and a pedestrian crossing the crosswalk is detected, the intersection traffic light 610 and the virtual red traffic light 620 may be displayed together as illustrated in FIG. 11A.

As such, according to the present disclosure, intersection traffic light information may be checked in advance during driving to prevent overspeed driving and signal violations to induce safe driving. When turning right or left at an intersection, it is possible to reduce crosswalk traffic accidents by providing a virtual traffic light based on a turn-on state of a crosswalk traffic light and pedestrian detection information.

In addition, according to the present disclosure, it is possible to prevent accidents by not only displaying a traffic light but also outputting a warning sound when a pedestrian is detected.

In addition, according to the present disclosure, it is possible to enhance visibility by displaying traffic light information in a place where a driver can easily recognize the information, such as using a vehicle head-up display, and displaying an image optimized for a surround view monitoring device.

FIG. 12 and FIG. 13 illustrate an example of a screen providing traffic light information according to an embodiment of the present disclosure. FIG. 12 and FIG. 13 illustrate display examples of intersection traffic light information using a surround view module (SVM) image HMI and a head-up display (HUD) HMI.

Referring to FIG. 12, examples in which the intersection traffic light is turned on as green, orange, red and orange, and red are displayed together with a turn-on remaining time of the traffic light.

Referring to FIG. 12, the traffic light information providing apparatus 100 displays a green light together with a front wide view when the intersection traffic light is green. The traffic light information providing apparatus 100 displays an orange or yellow light together with the front wide view when the intersection traffic light is orange or yellow. The traffic light information providing apparatus 100 displays the front wide view and a left side view together when the intersection traffic light is red and a left turn signal is green and displays a crosswalk traffic light in a traveling direction together with an intersection traffic light and a virtual traffic light depending on whether or not a pedestrian is detected. When the intersection traffic light is changed to red and orange, the traffic light information providing apparatus 100 continues to display the front wide view and the left side view and displays the intersection traffic light in red and orange. When the intersection signal light is red, the traffic light information providing apparatus 100 displays the front view and a rear view together and displays the intersection traffic light in red.

Referring to FIG. 13, examples of turn-on display in the case of a left turn, right turn stop (non-protected), right turn caution (non-protected), right turn safety (non-protected), etc. are illustrated.

When turning left or right, the traffic light information providing apparatus 100 may display the front wide view and the side view in a driving or turning direction together with intersection traffic light information.

In addition, the traffic light information providing apparatus 100 may display a crosswalk traffic light in the driving or turning direction and a virtual traffic light generated depending on whether a pedestrian is detected together when turning left or right.

As described above, according to the present disclosure, for a traffic light at a right side, which is not captured as an image, it is possible to create and display a virtual traffic light that indicates whether or not driving is possible by determining, through a vehicle external sensor, whether or not there is a pedestrian by acquiring image information related to a vehicle traffic light and a pedestrian traffic light and displaying traffic light turn-on information and remaining time for a driving direction of a host vehicle in consideration of changes and associations.

Figure 14:
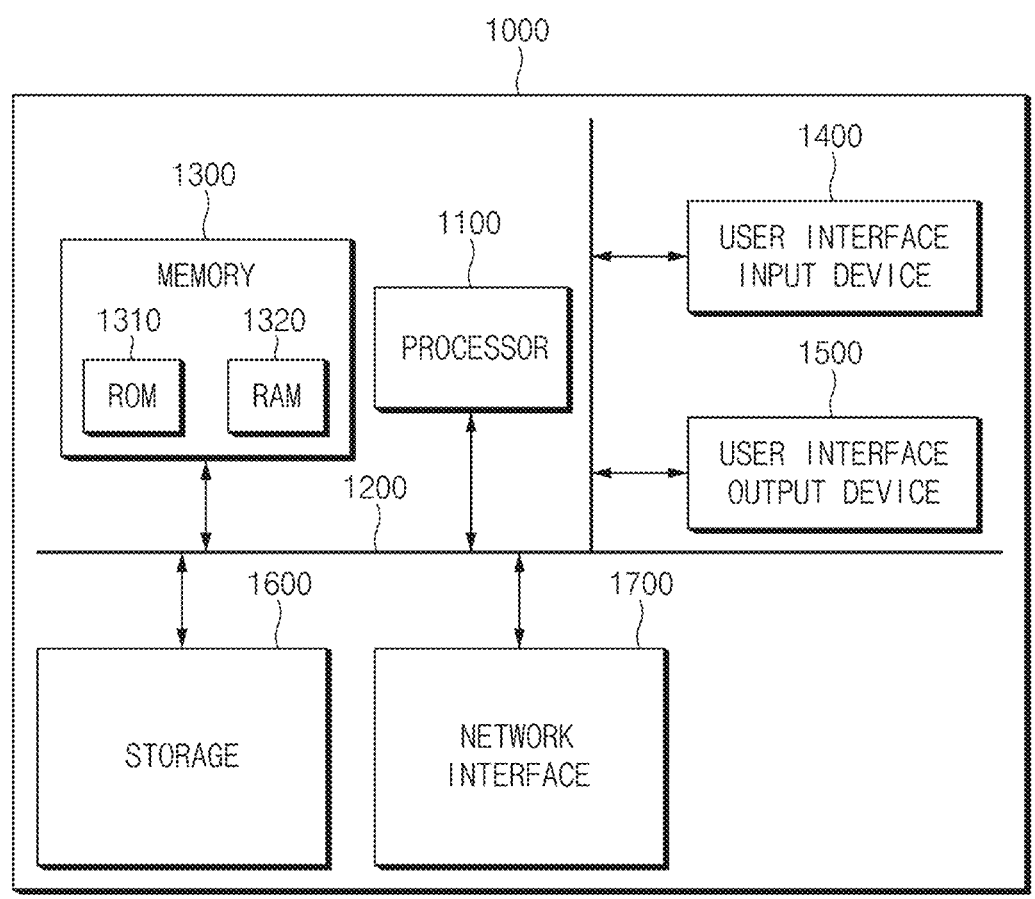
FIG. 14 illustrates a computing system according to an embodiment of the present disclosure.

FIG. 14 illustrates a computing system according to an embodiment of the present disclosure.

Referring to FIG. 14, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the embodiments disclosed herein may be directly implemented by hardware, a software module, or a combination of the two, executed by the processor 1100. The software module may reside in a storage medium (i.e., memory 1300 and/or the storage 1600) such as a RAM memory, a flash memory, a ROM memory, an EPROM memory, a EEPROM memory, a register, a hard disk, a removable disk, and a CD-ROM.

A storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description merely illustrates the technical idea of the present disclosure. Those having ordinary skill in the art to which the present disclosure pertains may make various modifications and variations without departing from the essential characteristics of the present disclosure.

Therefore, the embodiments shown and described in the present disclosure are not intended to limit the technical ideas of the present disclosure, but to explain them, and the scope of the technical ideas of the present disclosure is not limited by these embodiments. The protection range of the present disclosure should be interpreted by the claims below and all technical ideas within the equivalent range should be interpreted as being included in the scope of the present disclosure.

What is claimed is:

1. A traffic light information providing apparatus comprising:
a storage configured to accumulate and store intersection traffic light information;
a processor configured to convert turn-on information of a traffic light of an intersection in front of a vehicle into a database in the storage during driving of the vehicle and configured to pre-provide a user with traffic light information at the intersection or traffic light information at a crosswalk in a turning direction before or while passing through the intersection based on the converted database of the turn-on information of intersection traffic light; and a display device configured to display a turn-on color and a turn-on remaining time of the intersection traffic light,
wherein the processor is further configured to generate a virtual traffic light based on crosswalk traffic light information in a right or left turn direction and pedestrian detection information when the vehicle turns right or left at the intersection.

2. The traffic light information providing apparatus of claim 1, wherein the processor accumulates and stores the turn-on information of the intersection traffic light in the storage for each time.

3. The traffic light information providing apparatus of claim 2, wherein the processor calculates a turn-on cycle and a turn-on remaining time of the intersection traffic light based on the turn-on information of the intersection traffic light.

4. The traffic light information providing apparatus of claim 2, wherein the processor estimates a turn-on cycle of an intersection traffic light in a second direction that is opposite to a first direction of the intersection based on turn-on information of the intersection traffic light in the first direction.

5. The traffic light information providing apparatus of claim 4, wherein the turn-on information of the intersection traffic light includes colors of the intersection traffic light and a turn-on time for each color of the intersection traffic light.

6. The traffic light information providing apparatus of claim 2, wherein the processor calculates a turn-on cycle of the intersection traffic light in a third direction that is perpendicular to a first direction by calculating a time delay difference between turn-on times of the intersection traffic light in the third direction based on the turn-on information of the intersection traffic light in the first direction of the intersection.

7. The traffic light information providing apparatus of claim 1, wherein the processor displays the virtual traffic light together with the intersection traffic light in orange on the display device and outputs a text for attention when the vehicle turns right, a crosswalk traffic light in a traveling direction is green, and a pedestrian crossing the crosswalk is not detected.

8. The traffic light information providing apparatus of claim 1, wherein the processor displays the virtual traffic light together with the intersection traffic light in green on the display device when the vehicle turns right, a crosswalk traffic light in a traveling direction is red, and a pedestrian crossing the crosswalk is not detected.

9. The traffic light information providing apparatus of claim 1, wherein the processor displays the virtual traffic light in red when the vehicle turns right, a crosswalk traffic light in a traveling direction is green or red, and a pedestrian crossing the crosswalk is detected.

10. The traffic light information providing apparatus of claim 9, wherein the processor controls a warning sound to be outputted or the virtual traffic light to be flashed and displayed when the virtual traffic light is displayed in red.

11. The traffic light information providing apparatus of claim 1, wherein the display device displays a front view and a side view together when the vehicle turns right or left and displays the intersection traffic light and the virtual traffic light at one side.

12. A vehicle system comprising:
an image acquisition device configured to acquire turn-on information of an intersection traffic light in front;
a traffic light information providing apparatus configured to convert turn-on information of a traffic light of an intersection in front of a vehicle into a database during driving of the vehicle and configured to pre-provide a user with traffic light information at the intersection or traffic light information at a crosswalk in a turning direction before or while passing through the intersection based on the converted database of the turn-on information of the intersection traffic light; and
a vehicle display configured to display the traffic light information,
wherein the traffic light information providing apparatus comprises a processor configured to generate a virtual traffic light based on crosswalk traffic light information in a right or left turn direction and pedestrian detection information when the vehicle turns right or left at the intersection.

13. The vehicle system of claim 12, wherein the vehicle display includes a vehicle head-up display.

14. The vehicle system of claim 12, further comprising:
a pedestrian detection device configured to detect a pedestrian crossing the crosswalk.

15. A traffic light information providing method comprising:
collecting turn-on information of an intersection traffic light in front while a vehicle drives and converting it into a database;
generating traffic light information at an intersection or traffic light information at a crosswalk in a turning direction before or while passing through the intersection based on the converted database of the turn-on information of the intersection traffic light;
pre-providing a user with the traffic light information at the intersection or the traffic light information at the crosswalk in the turning direction; and
displaying a turn-on color and a turn-on remaining time of the intersection traffic light,
wherein the generating of the intersection traffic light includes generating a virtual traffic light based on crosswalk traffic light information in a right or left turn direction and pedestrian detection information when the vehicle turns right or left at the intersection.

16. The traffic light information providing method of claim 15, wherein
the converting of the turn-on information into the database includes
accumulating and storing the turn-on information of the intersection traffic light for each time.

17. The traffic light information providing method of claim 15, wherein the generating of the intersection traffic light includes calculating a turn-on cycle and a turn-on remaining time of the intersection traffic light based on the turn-on information of the intersection traffic light.

18. A traffic light information providing apparatus comprising:
a storage configured to accumulate and store intersection traffic light information;
a processor configured to convert turn-on information of a traffic light of an intersection in front of a vehicle into a database in the storage during driving of the vehicle and configured to pre-provide a user with traffic light information at the intersection or traffic light information at a crosswalk in a turning direction before or while passing through the intersection based on the converted database of the turn-on information of intersection traffic light; and
a display device configured to display a turn-on color and a turn-on remaining time of the intersection traffic light, wherein the display device displays a front view and a side view together when the vehicle turns right or left and displays the intersection traffic light and a virtual traffic light at one side.

* * * * *